M. A. WIGHTMAN.
TIRE CHAIN LOCK.
APPLICATION FILED FEB. 13, 1917.
1,238,859.
Patented Sept. 4, 1917.
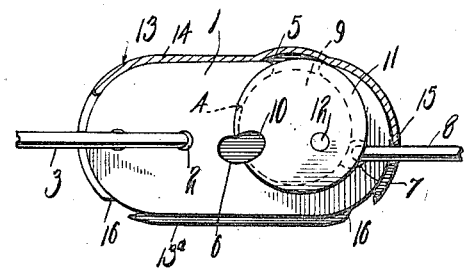
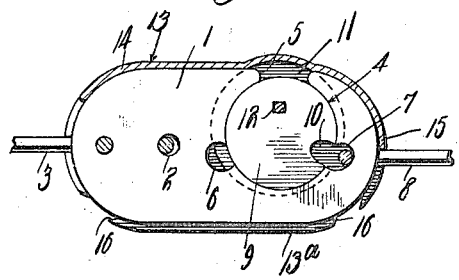
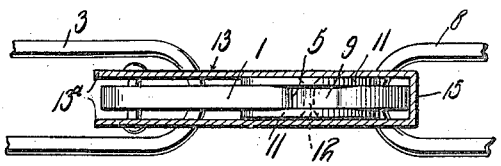
WITNESSES
W. C. Fielding
J. S. Schrott
INVENTOR
Mark A. Wightman
BY Richard Bowen
ATTORNEY

UNITED STATES PATENT OFFICE.

MARK A. WIGHTMAN, OF PRATTSBURG, NEW YORK.

TIRE-CHAIN LOCK.

1,238,859.   Specification of Letters Patent.   Patented Sept. 4, 1917.

Application filed February 13, 1917. Serial No. 148,459.

*To all whom it may concern:*

Be it known that I, MARK A. WIGHTMAN, a citizen of the United States, residing at Prattsburg, in the county of Steuben and State of New York, have invented certain new and useful Improvements in Tire-Chain Locks, of which the following is a specification.

My invention relates to improvements in tire chain locks, and it consists in the constructions, combinations, and arrangements herein described and claimed.

An object of my invention is to provide a tire chain lock which may be applied to any of the ordinary non-skid tire chains, by which the ends of the chain may be securely locked and prevented from becoming unfastened accidentally.

Another object of my invention is to provide a tire chain lock including a body portion having a rotatable locking disk which has a recess adapted to receive one of the non-skid chain links and upon being rotated, move the non-skid chain into a recess in the body portion where it is locked.

Other objects and advantages of the invention will appear from the following specification, reference being had to the accompanying drawings in which:

Figure 1 is a side elevation of the device showing the parts in a locked position, the shield being shown in section.

Fig. 2 is a side elevation of the device illustrating the position of the locking disks when the radial recess therein has moved into registration with the link receiving recess in the body of the lock.

Fig. 3 is a plan view of the device, and

Fig. 4 is a side elevation thereof showing more particularly the shield.

The invention consists essentially of a main locking body 1 which is provided with an aperture 2 at one end for receiving the link 3 of one end of a non-skid chain. The body 1 is provided to its other end with a circular seat 4. The circular seat 4 communicates through a throat way 5 with the upper edge of the body 1 as shown in Fig. 2.

The circular seat 4 has a recess 6 at one side and a second recess 7 at the other. The recess 7 is disposed at that end of the body 1 remote from the opening 2 in which the link 3 is held.

A link 8 of the free end of the non-skid chain is introduced and held in the recess 7.

Rotatably mounted in the circular seat 4 is a locking disk 9. The locking disk 9 has a recess 10 at one edge and is adapted to coöperate with the respective recesses 6 and 7 in the body 1. Guide plates 11 are secured on the rotatable locking disks 9 by means of a rivet 12. The shank of the rivet 12 is square as shown in Fig. 2 and the heads thereof are countersunk into the guide plate 11 so that a smooth surface is presented.

Fulcrumed on the body 1 adjacent to the opening 2 is a shield 13. The shield 13 consists of the side plates 13ᵃ as shown in Fig. 3 which are bridged at their upper ends and at 14. The bridge 14 of the shield 13 is curved downwardly at its forward end as at 15 to provide a resilient locking tongue which is adapted to engage the forward rounded end of the body 1 to retain the shield 14 in position. It will be observed that the shield 13 is fulcrumed on the body portion 1 of the link at the end thereof opposite to the locking disks 9. When the device is applied to a chain, the shield 13 is swung downwardly over the adjacent links 3 and 8 and in order that these links may be passed, channels 16 are provided in the shield.

The construction of my device having been described, the operation thereof is as follows:

The body 1 of the locking device is secured at one end of a non-skid chain through the medium of the opening 2 and the adjacent link 3. The locking device remains as a fixture on the chain and may be unlocked or freed from the remaining end of the chain by the manipulation of the locking disk 9.

When it is desired to introduce the link 8 of the free end of the chain into the recess 7, the locking disk 9 is turned until the recess 10 therein coincides with the throat way 5 at the top of the circular seat 4. The link 8 is then laid into the recess 10 and the locking disk 9 is rotated in either a clockwise or counter-clockwise direction to introduce the link 8 either into the recess 7 or the recess 6 as may be desired.

When the non-skid chain possess sufficient tension so that it fits smoothly around the tire, the locking disk 9 is rotated in a clockwise direction so that the link 8 will rest in the recess 7. Upon continued rotation of the locking disk 9 the edge of the guide plate 11 will bind onto the link 8 and hold it firmly into position. For this purpose the guide plates 11 are disposed eccentrically of the locking disk 9 as may be plainly seen from an inspection of Figs. 1 and 2.

Should the chain be loose, the locking disk 9 is rotated in a counter-clockwise direction upon introduction of the link 8 into the recess 10, whereupon the link 8 will be conveyed to the recess 6 and thus considerable slack in the chain is taken up.

While the device as illustrated in the drawings represents that of a generally preferred construction, obviously modifications and changes in the construction may be made without departing from the spirit of the invention or the scope of the claims.

I claim:

1. A tire chain lock, including a body portion having a circular seat and a locking recess in communication therewith, a rotatable locking disk mounted in the seat having a recess for receiving a link, and an eccentrically mounted guide plate on the disk for engaging and binding the link.

2. A tire chain lock, including a body portion having a circular seat, said body portion having a pair of recesses in communication with the seat, a locking disk rotatably mounted in the seat and having a link receiving recess, eccentrically mounted guide plates on the locking disks for engaging and binding a chain link, and a shield having a resilient end for engaging the edge of the body portion.

3. A tire chain lock, including a body portion adapted to be secured to one end of the chain, and means for receiving the other end of the chain and locking it onto the body portion said means being adapted to tighten the chain as the locking means is operated.

4. A tire chain lock, including a body portion adapted to be secured to one end of a chain, and rotatable locking means on the body for receiving the other end of the chain and locking it in position on the body portion by engaging the link.

5. A tire chain lock, including a body portion adapted to be secured to one end of the chain, said body having a circular seat provided with a throat way and locking recesses, a locking disk rotatably mounted in the circular seat being provided with a peripheral recess, guide plates eccentrically mounted on the locking disk and having recesses coinciding with the recess in the locking disk, said guide plates serving to hold the locking disks in position in the circular recess, and a shield fulcrumed on the body portion having a resilient end for covering the throat way.

6. A tire chain lock including a body having a seat communicating with a pair of recesses, a locking member movable in the seat and adapted to receive a chain link and convey the link to one or the other of the recesses, and a guide plate mounted on the locking member for engaging and binding the link.

In testimony whereof I affix my signature in presence of two witnesses.

MARK A. WIGHTMAN.

Witnesses:
WILLIAM CUFFNEY,
WARREN C. McCONNELL.